United States Patent Office 3,184,296
Patented May 18, 1965

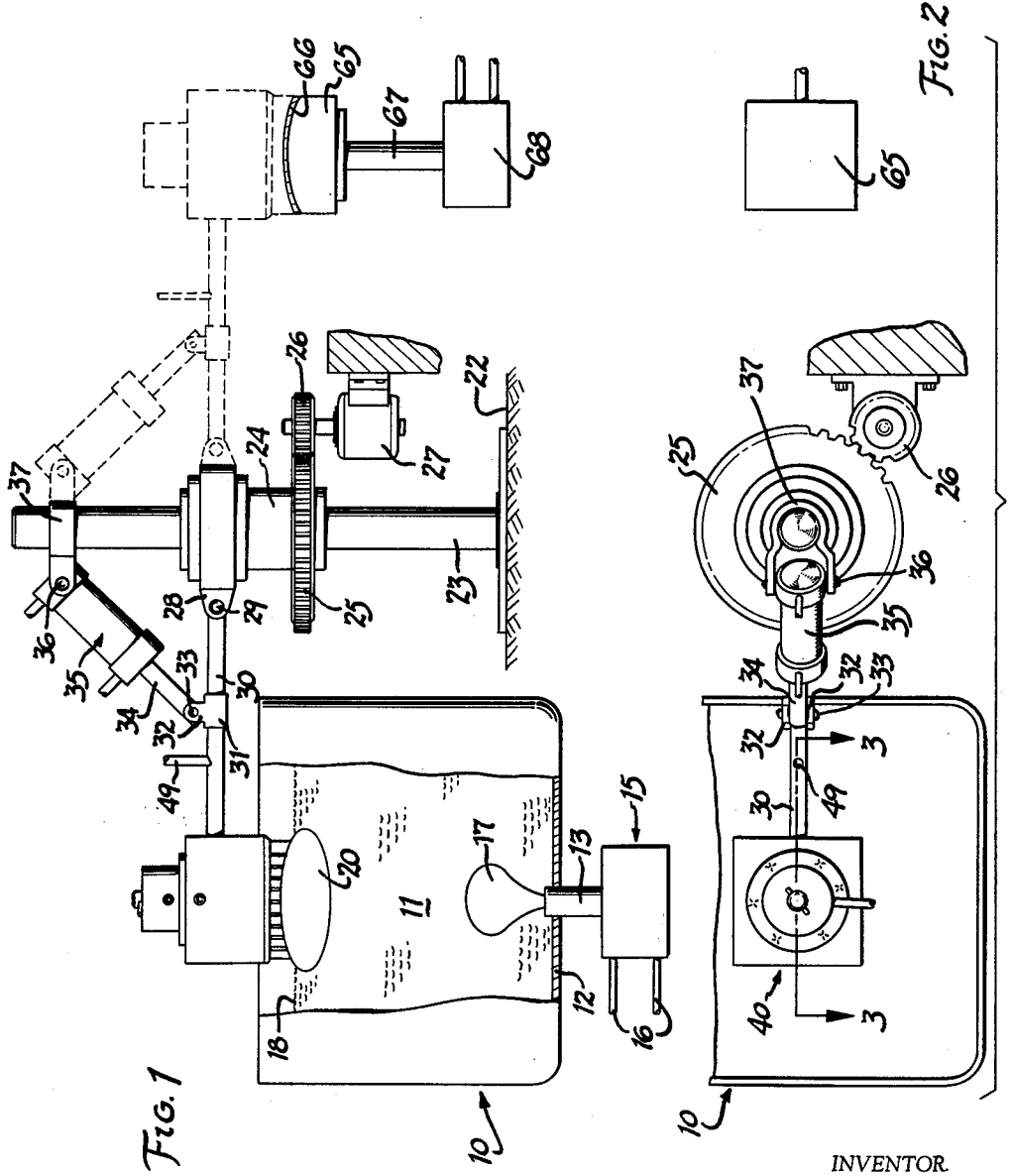

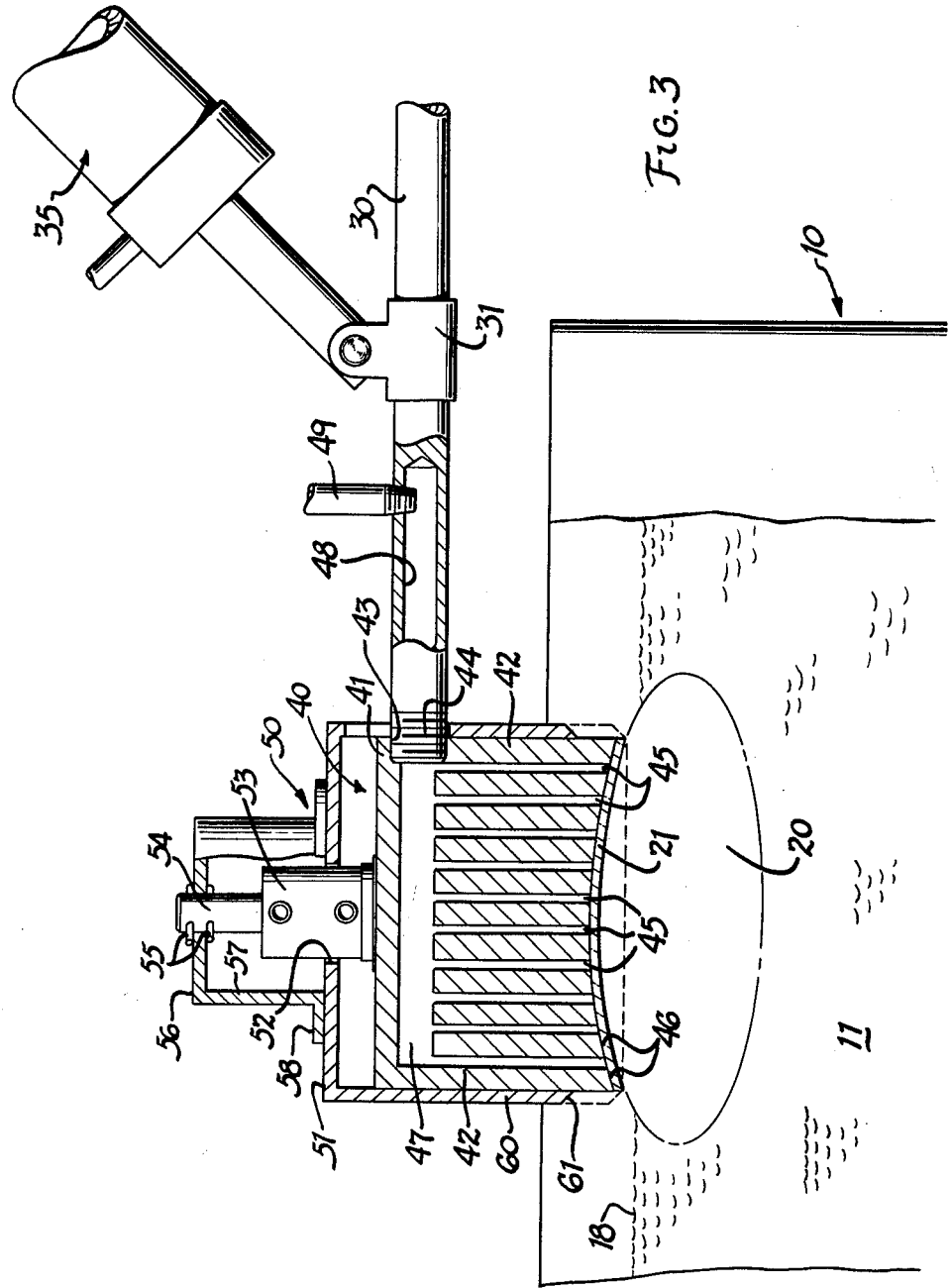

3,184,296
METHOD OF AND APPARATUS FOR MANUFACTURING PRESSED GLASS ARTICLES
Wilbur A. Schaich, Maumee, Ohio, assignor to Owens-Illinois Glass Company, a corporation of Ohio
Filed Mar. 12, 1963, Ser. No. 264,512
5 Claims. (Cl. 65—73)

The present invention relates to a method of and apparatus for manufacturing pressed glass articles and more particularly to the manufacture of such articles by the utilization of a novel blank-forming technique.

In the normal manufacture of pressed glass articles by conventional forming techniques, e.g. as described at pages 340–343 of F. V. Tooley's "Handbook of Glass Manufacture," Ogden Publishing Company, New York, New York (1953), a gob of glass is delivered from a conventional gob feeder into a female mold section and a male mold is merely brought into engagement with the gob with a sufficient force to press the gob to its final configuration between the mold parts.

In a manufacture of articles of relatively large surface area and of small cross-sectional area (hereafter referred to as "tray-like" articles) contact with the pressing mold parts will chill the gob to a solid state prior to completion of the forming of the article. In other words, the molten gob never fills the edges of the molding space.

Additionally, in the utilization of the method for the manufacture of articles from glass compositions having high liquidus temperatures and short working ranges, such as various devitrifiable glass compositions, the problem of solidification before completion of the forming of the article becomes particularly troublesome.

In order to overcome these difficulties, the present invention proposes the manufacture of "tray-like" articles by a new and distinct blank-forming technique wherein a hollow "bubble" or blown shape is formed in a body of molten glass to provide a relatively thin glass blank of substantially the described configuration and which is utilized as a substitute for the usual "gob" from which the pressed article is formed.

In a preferred embodiment of the present invention, a bubble is formed in a body of molten glass and, at the surface of the body of glass, an exposed portion of the bubble is contacted by a vacuum pick-up head. Upon rupturing of the bubble, a thin blank remains adhered to the pick-up head for transfer to a forming station. If desired, the pick-up head may form one of the press mold elements, although the blank may be readily transferred to different and distinct press mold elements if desired.

By utilizing the techniques of the present invention, a blank is obtained which corresponds more closely to the final, press, "tray-like" configuration of the pressed article than does the gob heretofore utilized, so that the problems of premature gob chilling during pressing are eliminated. Further, the technique makes possible the utilization of pressing elements to form pressed articles from the normally difficultly workable devitrifiable glasses or the like.

It is, therefore, an important object of the present invention to provide a new and novel apparatus of and apparatus for the pressing of glass articles utilizing a novel blank-forming technique.

Another important object of the present invention is the provision of a method of and apparatus for press-forming glass articles wherein a blank is formed from a portion of a bubble present at the surface of a body of molten glass.

A further object of this invention is the provision of a method of and apparatus for forming a blank from which a pressed glass article can be made by generating a bubble at the surface of a body of molten glass, adhering an exposed portion of the bubble to a pick-up device, and rupturing the bubble to retain the adhered portions thereof to the pick-up device for subsequent utilization in a pressing operation.

It is a further, and no less important, object of the present invention to provide a novel method of and apparatus for making a pressed glass article by adhering to one of a pair of pressing elements an exposed surface portion of a blown bubble formed in a body of molten glass, transferring the adhered glass surface to a pressing location, and pressing the glass to a final configuration.

Other objects of this invention will appear in the following description and appended claims, reference being had to the accompanying drawings forming a part of this specification wherein like reference characters designate corresponding parts in the several views.

FIGURE 1 is a side elevational view, somewhat schematic in nature, illustrating an apparatus of the present invention capable of carrying out the method of the present invention;

FIGURE 2 is a plan view of the apparatus of FIGURE 1; and

FIGURE 3 is an enlarged fragmentary sectional view, with parts shown in elevation, taken along the plane 3—3 of FIGURE 2.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 10 refers generally to a melter tank or the like containing a body 11 of molten glass. The bottom wall 12 of the tank is pierced by a vertical bubbler tube 13 forming a part of a bubbler apparatus, indicated generally at 15, receiving air or other gaseous medium through inlet conduits 16. The bubbler unit 15 preferably is of the type disclosed in Patent No. 2,890,548 to J. W. Wright and assigned to the assignee of the present invention.

The bubbler unit 15 is capable of intermittently issuing therefrom the gaseous medium from the conduits 16 in such a manner as to form relatively large discrete bubbles 17 which rise to the surface 18 of the body of molten glass 11 to appear at the surface as enlarged ellipsoidal gas-filled bodies 20 totally enclosed by a thin skin 21 of molten glass, a portion at least of this thin skin 21 being exposed above the molten glass level 18.

By the judicious selection of the operating conditions, including the volume and pressure of air emitted from the bubbler pipe 13, the depth of the body of molten glass 11 and the temperature of the molten glass 11, large ellipsoidal gaseous bodies or bubbles 20 can be formed at the molten glass body surface 18 at desired time intervals.

Positioned adjacent the molten glass tank 13, as upon a floor surface 22, is an upstanding column or support 23 provided with a rotatable, cylindrical collar 24 circumscribing the column and freely movable thereabout. This collar 24 is rotationally driven by means of a toothed pinion 25 secured thereto and meshing with a drive pinion 26 rotatable by suitable means, as by an electric drive motor 27.

The collar 24, above the pinion 25, is provided with a bifurcated support bracket 28 bearing a pivot pin 29 upon which is pivotally supported a pick-up arm 30. This arm 30 projects radially of the sleeve 24 and the column 23, so that its free end overhangs the molten glass tank 10. The arm 30 is provided medially of its length with an actuating bracket 31 having upwardly deflected, transversely spaced ears 32 supporting therebetween a pivot pin 33 to which is secured the actuating rod 34 of a fluid pressure actuated cylinder 35, the cylinder having its remote end pivoted, as at 36, to a bifurcated bracket 37 freely rotatable about the support post 23.

As best illustrated in FIGURE 3 of the drawings, that end of the arm 30 normally overlying the body of molten glass 11 is provided with a pick-up head indicated generally at 40. This head is preferably rectangular in cross-section and comprises a block 41 threadedly apertured, as at 43, to receive therein the threaded end 44 of the arm 30. The arm 30 and the head 40 are thus jointly displaceable rotationally about the post 23 and pivotally by the cylinder 35.

The head block 41 is provided with a plurality of vertical apertures or bores 45 opening freely onto the bottom of the head block which is contoured, as at 46, to an overall concave configuration conforming substantially to the convex wall 21 of the bubble 20. At their upper ends, the bores 45 communicate with an enlarged vacuum chamber 47 which, in turn, communicates with a vacuum passage 48 formed by a recess in the free end of the arm 30 and communicating, as by a conduit 49, with a source of vacuum. The apertures 45 are surrounded by solid peripheral walls 42 constituting the head side walls.

Obviously, the source of vacuum communicating with the conduit 49 evacuates the passage 48, the chamber 47 and the bores 45 so that upon contact between the lower extremities 46 of the head 40 and the surface of the bubble 20, adherence between the head and the surface of the bubble is obtained.

A cut-off or shear mechanism 50 is provided for the head 40 (FIGURE 3), this mechanism 50 comprising an upper plate 51 provided with a central aperture 52 through which projects an actuating cylinder 53 secured to the upper surface of the top wall 41 of the head 40, the cylinder having its actuating rod 54 provided with cotter pins 55 or the like positioned on either side of an upper plate 56 having peripheral depending walls 57 joined, as at 58, to the top wall 51 of the shearing mechanism 50. Thus, upon actuation of the cylinder 53 from its illustrated uppermost position, the plate 51 will be lowered relative to the head 40.

The plate 51 is provided with peripheral depending walls 60 terminating in shearing edges 61, the wall 60 telescoping over the head 40 when the cylinder 53 is actuated, so that the shearing edges 61 engage the bubble 20 and rupture the bubble 20. When the bubble 20 is ruptured, only that portion of the bubble constituting the wall 20 engaged by the undersurfaces 46 of the head 40 will remain adhered to the head, due to the vacuum condition existing at the head undersurface 46.

Following the adherence of the wall 21 of the bubble to the head 40 and the shearing or rupture of the remainder of the bubble, the cylinder 35 is actuated to elevate the arm 30 about its pivot pin 29 and the motor 27 is actuated to drive the collar 24 rotationally about the post 23, by means of the pinions 25, 26. The head 40, carrying the bubble wall 21, is rotated to its dotted position of FIGURE 1, the cylinder 35 being actuated to adjust the vertical location of the head. At its dotted line position of FIGURE 1, the head 40 is in vertical registry with a lower pressing mold element 65 having a contoured, preferably convex upper surface 66 conforming to the configuration of the undersurface 46 of the head 40. The mold element 65 is vertically actuated by the actuating rod 67 of a lower, fluid pressure actuated cylinder 68, so that the pressing element 65 can cooperate with the head 40 to form the glass portion 21 to the desired final "tray-like" configuration.

Following final forming, the mold elements 40, 65 are separated and the press formed article is removed from its pressing position between the elements (incidentally releasing the vacuum in the head 40), the head 40 is rotated to its solid line position of FIGURE 1 (the vacuum being again formed in the head 40), and the cycle is reinitiated.

Of course, it will be appreciated that the device illustrated in FIGURES 1 through 3 of the drawings is merely illustrative of an apparatus capable of carrying out the method of the present invention, and apparatus of similar function, but distinct design, may also be utilized. For example, the tank 10 for the body of molten glass 11 may be a rotary pot, as in a well known Owens-type suction machine of the type illustrated in U.S. Letters Patent 766,768 and as described in the above-identified "Handbook of Glass Manufacture," pages 306–317, inclusive. Further, it will be appreciated that the head 40 and the actuating elements therefor may be similar to the Owens machine heads of conventional type and also as described in the above-identified portions of the "Handbook of Glass Manufacture." Alternatively, a Westlake-type suction machine, such as described in Soubier Patent 1,856,518, may be utilized wherein the head is moved in contact with the molten glass. From a consideration of these two well known glass machines and processes, it will be appreciated that the pick-up head 40 may be replaced by well known gob gathering and forming mechanisms in which the gob gathering mechanism is adapted to the shape of the bubble 20.

So far as the forming of the molten glass retained on the suction head 40 is concerned, the apparatus illustrated in FIGURE 1 for press forming may be readily varied by utilization of the head 40 merely to carry the glass blank 21 to the forming head and to utilize a conventional, multi-station forming mechanism to carry out the actual forming operation. To aid in removing the blank from the head 40, the suction exerted thereon through the conduit 49 is, of course, interrupted and, if desired, a blast of air under pressure may be introduced into the chamber 47 to force the glass blank 21 from the head.

All in all, it will be appreciated that the present invention provides a new and novel method of and apparatus for forming a blank from which a pressed glass article is to be manufactured. The utilization of a gaseous bubble from which the blank is formed possesses the several advantages of providing a blank of substantial surface area, of substantially uniform wall thickness, and of a configuration ideally suited to the formation of "tray-like" articles. The simplicity of blank formation by merely contacting the surface of a bubble of desired configuration, rupturing the bubble to retain only the desired portion at the suction head, and transferring the blank to a post forming operation can be easily and readily carried out by simple apparatus. Although a specific shearing mechanism has been illustrated, it will be appreciated that the separation of the blank from the remainder of the bubble can be carried out in any desired manner after the desired portion of the bubble has been adhered to the vacuum head. For example, actuation of the cylinder 35 to elevate the head after contact between the bubble wall 21 and the undersurface of the head has been secured will readily fracture the bubble with the remainder of the molten glass initially forming the bubble being reintegrated into the body of molten glass 11. Further, a plurality of radial arms 30 may be mounted upon the post 23 to form a multiple station machine.

Having thus described my invention, I claim:

1. In a method of making a pressed glass article, the steps of forming a bubble at the exposed surface of a body of molten glass, adhering the upper surface only of said bubble to a pick-up head, rupturing the bubble to retain on said pick-up head a thin layer of glass, transferring the head and the retained layer of glass to a pressing station, and pressing the layer of glass to a final configuration.

2. In an apparatus for making a pressed glass article, means for generating a gaseous bubble in a body of molten glass, a pick-up head for contacting a surface portion of the bubble exposed at the molten glass surface, means for adhering to said head the surface portion only of the bubble, and means for pressing said surface portion to the shape of said article.

3. In a method of making a pressed glass article, the steps of forming a gas-filled bubble of molten glass at the exposed surface of a body of molten glass, adhering a portion only of said bubble to a pick-up head, rupturing the bubble to retain on said pick-up head a thin layer of molten glass, transferring the head and the retained layer of glass to a pressing station, and contacting the retained layer of glass on said head with a pressing element to form the glass to a final configuration.

4. In an apparatus for making a pressed glass article, means providing a body of molten glass having an exposed upper surface, means for generating a gaseous bubble in said body of molten glass, a pick-up head having a perforate concavo-convex surface for contacting a surface of the bubble exposed at the molten glass surface, means for evacuating said pick-up head to adhere the surface of the bubble to the perforate surface of said head, shearing means carried by said head for shearing the adhered portion of said bubble from the remainder of said bubble, means supporting said head and the adherent portion of said bubble for movement, means for moving said head and said bubble portion to a pressing station, and means for pressing said bubble portion to a desired configuration while still supported by said head.

5. In an apparatus for making a pressed glass article, means enclosing a body of molten glass having an exposed upper surface, means for generating a gaseous bubble in said body of molten glass, a pick-up head having a perforate surface for contacting said surface portion of the bubble exposed at the molten glass surface, means for evacuating said pick-up head to adhere the surface portion of the bubble thereto, means for rupturing said bubble, means supporting said head and the adherent portion of said bubble for movement, means for moving said head and said bubble portion to a pressing station, and means for pressing said bubble portion to the shape of said article at said pressing station.

References Cited by the Examiner
UNITED STATES PATENTS

| | | | |
|---|---|---|---|
| 788,142 | 4/05 | Pease | 65—192 X |
| 788,143 | 4/05 | Pease | 65—192 X |
| 800,644 | 10/05 | Haley | 65—210 |
| 2,288,029 | 6/52 | Rowe | 65—216 |
| 2,702,924 | 3/55 | Plourde | 264—4 |

DONALL H. SYLVESTER, *Primary Examiner.*